(12) United States Patent
Elkins

(10) Patent No.: US 12,157,333 B2
(45) Date of Patent: Dec. 3, 2024

(54) WHEEL HUB

(71) Applicant: Stephen Michael Elkins, Bradwell (GB)

(72) Inventor: Stephen Michael Elkins, Bradwell (GB)

( * ) Notice: Subject to any disclaimer, the term of this patent is extended or adjusted under 35 U.S.C. 154(b) by 392 days.

(21) Appl. No.: 17/636,777

(22) PCT Filed: Aug. 18, 2020

(86) PCT No.: PCT/GB2020/051975
§ 371 (c)(1),
(2) Date: Feb. 18, 2022

(87) PCT Pub. No.: WO2021/038196
PCT Pub. Date: Mar. 4, 2021

(65) Prior Publication Data
US 2022/0281265 A1   Sep. 8, 2022

(30) Foreign Application Priority Data

Aug. 23, 2019   (GB) ..................................... 1912177

(51) Int. Cl.
*F16D 41/30* (2006.01)
*B60B 27/02* (2006.01)
(Continued)

(52) U.S. Cl.
CPC .......... *B60B 27/023* (2013.01); *B60B 27/047* (2013.01); *B62L 1/005* (2013.01);
(Continued)

(58) Field of Classification Search
CPC .............................. F16D 41/30; B60B 27/023
See application file for complete search history.

(56) References Cited

U.S. PATENT DOCUMENTS 6,591,956 B1 *  7/2003  Neugent ................. F16D 41/30
                                                        192/64
6,994,189 B2     2/2006  Chen
(Continued)

FOREIGN PATENT DOCUMENTS

CN    209257769 U    8/2019
EP    3636450 A1     4/2020
(Continued)

*Primary Examiner* — Stacey A Fluhart
(74) *Attorney, Agent, or Firm* — patenttm.us

(57) ABSTRACT

A wheel hub (10) comprises a main body (12) and a drive axle arrangement (14) extending through the main body (12). The main body (12) is rotatable about the drive axle arrangement (14). The wheel hub (10) further includes a transmission assembly comprising first and second transmission arrangements (44, 46). The first transmission arrangement (44) is provided on the drive axle arrangement (14), and the second transmission arrangement (46) is provided on the main body (12). The first transmission arrangement (44) is cooperable with the second transmission arrangement (46) to transmit a driving force from the drive axle arrangement (14) to the main body (12). The drive axle arrangement (14) comprises an axle portion (34) and a sprocket carrier (42). The axle portion (34) extends through the main body (12), and the sprocket carrier (42) is configured to carry at least one sprocket.

21 Claims, 9 Drawing Sheets

(51) Int. Cl.
  *B60B 27/04*   (2006.01)
  *B62L 1/00*   (2006.01)
  *B62M 9/10*   (2006.01)
  *F16D 65/12*   (2006.01)
  *F16D 65/02*   (2006.01)

(52) U.S. Cl.
  CPC .............. *B62M 9/10* (2013.01); *F16D 41/30* (2013.01); *F16D 65/123* (2013.01); *B60Y 2200/13* (2013.01); *F16D 2065/1384* (2013.01)

(56) References Cited

U.S. PATENT DOCUMENTS

| | | | |
|---|---|---|---|
| 2007/0089958 A1* | 4/2007 | Kanehisa | F16D 41/30 192/64 |
| 2007/0132306 A1 | 6/2007 | Chang | |
| 2016/0214433 A1* | 7/2016 | Chamberlain | B62M 9/10 |
| 2016/0311256 A1* | 10/2016 | Hara | B60B 27/04 |
| 2018/0057107 A1* | 3/2018 | Yamamoto | B62M 11/16 |
| 2019/0084641 A1* | 3/2019 | Mandaric | B60B 27/04 |
| 2020/0009907 A1* | 1/2020 | Cotter | B60B 27/023 |

FOREIGN PATENT DOCUMENTS

| | | |
|---|---|---|
| IT | UB20154243 A1 | 4/2017 |
| TW | 202014317 A | 4/2020 |

\* cited by examiner

WHEEL HUB

This invention relates to wheel hubs. This invention also relates to wheels incorporating wheel hubs. More particularly, but not exclusively, this invention relates to wheel hubs for use in cycle wheels. Embodiments of the invention relate to wheel hubs for use in spoked wheels. This invention also relates to bicycle wheel hubs.

Bicycle wheel hubs include a main body and an axle extending through the main body to support the hub. The axle is fixed and allows the wheel hub to be attached to the rear dropouts of the bicycle. The hub further includes a freehub body, which is a rotary sprocket carrier for a cassette of sprockets to provide drive to the bicycle. The freehub body is rotatably connected to the main body by a pawl and ratchet. In general, the pawl and ratchet arrangement is disposed radially inwardly of the end of the main body adjacent the freehub body.

According to one aspect of this invention, there is provided a wheel hub comprising: a main body; a drive axle arrangement extending through the main body, the main body being rotatable about the drive axle arrangement; and a transmission assembly comprising first and second transmission arrangements, the first transmission arrangement being provided on the drive axle arrangement, and the second transmission arrangement being provided on the main body; the first transmission arrangement being cooperable with the second transmission arrangement to transmit a driving force from the drive axle arrangement to the main body; wherein the drive axle arrangement comprises an axle portion and a sprocket carrier, the sprocket carrier being configured to carry at least one sprocket. The wheel hub may be a wheel hub for a bicycle.

According to another aspect of this invention, there is provided a wheel hub for a bicycle, said wheel hub comprising: a main body; an axle assembly, the main body being rotatable about the axle assembly; and a plurality of bearings between the axle assembly and the main body, wherein at least one of the bearings may be slidably mounted on the main body or the axle assembly.

The axle assembly may comprise a drive axle arrangement extending through the main body, the main body being rotatable about the drive axle arrangement. The wheel hub may comprise a first transmission arrangement on the drive axle arrangement.

The first transmission arrangement may be cooperable with a second transmission arrangement on the main body to transmit a driving force from the drive axle arrangement to the main body.

The wheel hub may further include a support arrangement for supporting the drive axle arrangement. The support arrangement may support the main body. The support arrangement may extend through the drive axle arrangement. The drive axle arrangement may be rotatable about the support arrangement.

According to another aspect of this invention, there is provided a wheel hub comprising: a main body; a drive axle arrangement extending through the main body, the main body being rotatable about the drive arrangement; a transmission assembly comprising first and second transmission arrangements, the first transmission arrangement being provided on the drive axle arrangement, and the second transmission arrangement being provided on the main body; the first transmission arrangement being cooperable with the second transmission arrangement to transmit a driving force from the drive axle arrangement to the main body; wherein the drive arrangement comprises a sprocket carrier configured to carry at least one sprocket; and a support arrangement for supporting the drive axle arrangement, the support arrangement extending through the drive axle arrangement, and the drive axle arrangement being rotatable about the support arrangement.

The drive axle arrangement may comprise an axle portion and a sprocket carrier. The axle portion may extend through the main body. The sprocket carrier may be configured to carry at least one sprocket.

The drive axle arrangement may be rotatable about the support arrangement. The support arrangement may extend through the main body. The main body may be rotatable about the support arrangement.

The support arrangement may comprise first and second end members at respective opposite ends of the main body.

The axle portion may extend through the main body. The support arrangement may comprise a spindle arrangement.

The support arrangement may comprise a central spindle portion, which may extend through the drive axle arrangement. The central spindle portion may be attached to each of the first and second end members. The central spindle portion may be substantially cylindrical.

The first and second transmission arrangements may in combination comprise a transmission assembly. The transmission assembly may comprise a freewheel mechanism. The first and second transmission arrangements may be configured to transmit the driving force from the drive axle arrangement to the main body when the drive axle arrangement is rotated in a forward direction, and to allow the drive axle arrangement to rotate in an opposite rearward direction relative to the main body.

The transmission assembly may comprise a ratchet assembly. The ratchet assembly may comprise a toothed annular portion and a pawl. The first transmission arrangement may comprise a pawl holding member for holding the pawl. The second transmission arrangement may comprise the toothed wheel. Alternatively, the first transmission arrangement may comprise the toothed wheel, and the second part may comprise the pawl.

The ratchet assembly may comprise any suitable number of pawls, for example one, two, three, four or more pawls. The first transmission arrangement may be attached to the drive axle arrangement. The first transmission arrangement may be non-rotatable relative to the drive axle arrangement.

The sprocket carrier may be attached to the axle portion at a first end of the axle portion. The first transmission arrangement may be provided at an opposite second end of the axle portion. It will be appreciated that, in some embodiments, the first transmission arrangement may be provided anywhere along the axle portion.

The first transmission arrangement may be attached to the axle portion. The first transmission arrangement may be non-rotatable relative to the axle portion.

The main body may have first and second opposite end regions, the axle portion extending from the first end region to the second end region. The sprocket carrier may be provided on the axle portion at the first end region of the main body. The transmission assembly may be provided at the second end region of the main body.

The wheel hub may comprise the second transmission arrangement. The second transmission arrangement may be provided on the second end region of the main body.

The second transmission arrangement may be a part of the main body. The second transmission arrangement may be an integral part of the main body.

The main body may comprise a securing formation to allow the second transmission arrangement to be secured to the main body. The securing formation may be provided at the second end region of the main body. The securing formation may define a securing aperture through which a fastener can extend to secure the transmission arrangement to the main body.

Desirably, the securing portion may define a plurality of the securing apertures through each of which a respective fastener can extend to secure the transmission arrangement to the main body.

A securing arrangement may be cooperable with the securing formation to secure the second transmission arrangement to the securing formation. The securing arrangement may secure the second transmission arrangement to the securing formation in cooperative association with said first transmission arrangement. The second transmission arrangement may be secured to the securing formation at said second end region of the main body.

The wheel hub may comprise a transmission member on which the second transmission arrangement is provided. The transmission member may include a securing portion to allow the transmission member to be secured to the main body. The securing portion may be secured to the main body in cooperative alignment with the securing formation. The securing portion may be secured to the securing formation.

The securing formation may extend outwardly from the second end region of the main body. Desirably, the securing formation may extend radially from the second end region of the main body. The securing formation may comprise a disc attaching member.

The transmission member may comprise a brake component which can be secured to the main body. The brake component may be circular. The securing arrangement may secure the brake component to the securing formation.

The securing arrangement may comprise a fastener, such as a bolt. The securing formation may define a fastening aperture for receiving the fastener. The fastener may extend through the brake component. The securing arrangement may comprise a plurality of the fasteners insertable through the brake component.

The securing formation may define a plurality of the fastening apertures to receive the fasteners. The securing arrangement may further include a cover member through which the, or each, fastener extends to secure the transmission member to the main body.

The, or each, fastening aperture in the securing formation may be threaded to cooperate with corresponding threads on the, or each, fastener.

The securing portion may define a further securing aperture through which a fastener can extend into the securing aperture in the securing formation of the main body.

Desirably, the securing portion may define a plurality of the further securing apertures through each of which a respective fastener can extend into a respective one of the securing apertures in the securing formation of the main body.

The securing portion may comprise an outer portion. The brake component may define a central aperture to receive the support arrangement therethrough, and allow the brake component to be received on the main body.

The transmission member may have an inner edge defining the central aperture.

The second transmission arrangement may be provided on the brake component in the aperture. The second transmission arrangement my be provided on the aforesaid inner edge.

The second transmission arrangement may comprise a projecting portion to cooperate with the first transmission arrangement on the drive axle arrangement. The projecting portion may be provided on the brake component. The projecting portion may be provided on the inner edge of the brake component. The projecting portion may be annular.

The projecting portion may comprise the aforesaid toothed annular portion. The projecting portion may extend around the inner edge of the brake component. The projecting portion may extend in an annular configuration around the central aperture.

The projecting portion may extend axially from the brake component. The projecting portion may have radially inner and outer faces. The toothed arrangement may be provided on the radially inner face of the annular portion.

The brake component may comprise a spacing member, which may engage the disc attaching member. The disc brake may comprise a brake disc arranged to be gripped by the pads of a disc brake caliper. The spacing member may be for spacing a brake disc from the disc attaching member. The, or each, fastener may be insertable through the brake disc and the spacing member.

The second transmission arrangement may be provided on the spacing member. The second transmission arrangement may be arranged on the spacing member to be aligned with the first transmission arrangement when the spacing member is secured to the main body.

The projecting portion may extend through the brake disc to be aligned with the first transmission arrangement.

The securing portion of the spacing member may be configured so that, in use, the securing portion engages the brake disc and the disc securing formation.

Alternatively, the brake component may comprise a brake disc. The second transmission arrangement may be provided on the brake disc. The second transmission arrangement may be arranged on the brake disc to be aligned with the first transmission arrangement when the brake disc is secured to the main body.

The brake component may comprise radially inwardly extending teeth to engage the first transmission arrangement. The teeth may be arranged in an annular array.

The brake disc may define the central aperture. The second transmission arrangement may be provided on the inner edge defining the central aperture.

The disc brake assembly may include a spacer having an inner edge defining a central aperture, the inner edge having a further part of the second transmission arrangement. The disc brake assembly may comprise two of the spacers arranged on opposite sides of the brake disc.

The sprocket carrier may be fixedly attached to the axle portion, wherein the sprocket carrier and the axle portion cannot rotate relative to one another. The axle portion may be integrally attached to the sprocket carrier. Alternatively, the axle portion may be separate from the sprocket carrier and attached thereto, for example by cooperating threads.

The wheel hub may comprise a plurality of bearings. The plurality of bearings may comprise radially outer bearings between the main body and the drive axle arrangement. Thus, the main body may rotate about the drive axle arrangement.

The plurality of bearings may comprise radially inner bearings between the drive axle arrangement and the support arrangement. Thus, the drive axle arrangement may rotate around the support arrangement.

The plurality of bearings may comprise first and second of the radially outer bearings. The plurality of bearings may comprise first and second of the radially inner bearings.

At least one of the radially outer bearings may be slidable relative to the main body or the drive axle arrangement. At least one of the radially inner bearings may be slidably mounted relative to the drive axle arrangement or the support arrangement.

The radially outer bearing may be slidably mounted relative to the drive axle arrangement. The radially inner bearing may be slidably mounted relative to the drive axle arrangement. Alternatively, the radially inner bearing may be slidably mounted relative to the support arrangement.

Outer urging means may be provided to urge the one of the first and second radially outer bearings towards the other of the first and second radially outer bearings. The outer urging means may apply axial preload on each of the radially outer bearings. The outer urging means may be provided between the first transmission arrangement and the second radially outer bearing.

Inner urging means may be provided to urge one of the first and second radially inner bearings towards the other of the first and second radially inner bearings. The inner urging means may apply axial preload on each of the radially inner bearings. The outer and inner urging means may comprise respective spring means, such as respective spring washers or preload washers.

The main body may include first and second raised portions at the respective opposite first and second end regions of thereof. The first and second raised portions may comprise first and second flange portions.

A tubular connecting portion may extend between the first and second raised portions. The first and second raised portions may define a plurality of spoke holes through which spokes can extend to secure the wheel hub to a rim.

The first and second raised portions may define spoke holes that are configured to accommodate J shaped spokes or straight spokes.

Each of the first and second raised portions may have externally facing surfaces. A central region of the main body may be defined from the externally facing surface of the first raised portion to the externally facing surface of the second raised portion.

The first transmission arrangement may be provided externally of the central region. The second transmission arrangement may be provided externally of the central region of the main body.

The first transmission arrangement may be provided externally of the main body. The second transmission arrangement may also be provided externally of the main body.

The support arrangement may include attaching formations for attaching the wheel hub to a bicycle frame.

The sprocket carrier may comprise a freehub body on which one or more sprockets can be arranged.

The first radially outer bearing may be arranged between the first end region of the main body and the drive axle arrangement. The first radially outer bearing is fixed axially relative to the main body and the drive axle arrangement.

The first radially inner bearing may be arranged between the first end member and the sprocket carrier. The first radially inner bearing may be axially fixed relative to the first end member and the sprocket carrier.

The second radially outer bearing may be arranged between the second end of the main body and the first transmission arrangement. For example, the second radially outer bearing may be arranged between the main body and the pawl holding member. The outer race of the second radially outer bearing may be mounted on the main body. The outer race of the second radially outer bearing may be axially fixed relative to the main body. The inner race of the second radially outer bearing may be slidably mounted relative to the first transmission arrangement. The inner race of the second radially outer bearing may be slidably mounted relative to the pawl holding member.

The second radially inner bearing may be arranged between the pawl holding member and the second end member. The inner race of the second radially inner bearing may be mounted on the second end member. The inner race of the second radially inner bearing may be slidably mounted on the support arrangement. The inner race of the second radially inner bearing may slidably mounted relative to the second end member. The outer race of the second radially inner bearing may be axially fixed relative to the pawl holding member.

The support arrangement may comprise first and second opposite end portions of the central spindle portion.

The support arrangement may comprise first and second end members. The first end member may comprise a first external region. The first end member may comprise a first internal region. The first internal region may be arranged inside the main body.

The first end portion of the central spindle portion may be received in the first internal region of the first end member, thereby mounting the central spindle portion on the first end member.

The second end member may comprise a second external region. The second end member may comprise a second internal region. The second internal region may be arranged inside the main body. The internal region may be received in the second end portion of the central spindle portion.

Each of the first and second end members may define a respective receiving bore for receiving a wheel mounting component. The wheel mounting component may mount the wheel on the bicycle frame. The wheel mounting component may comprise an axle, quick release mechanism or other shaft suitable for connecting the wheel hub to a bicycle. Examples of wheel mounting components are skewers or through axle bolts.

If desired, the support arrangement may have threaded ends to extend through the dropouts of the bicycle frame and which may cooperate with nuts to secure the wheel hub to the frame. It will be appreciated that the wheel hub may be configured to be used with any suitable means for mounting the hub on the bicycle frame.

The second radially outer bearing may have an inner race. The inner race may be slidably mounted on the pawl holding member.

The first radially inner bearing may be arranged between the first end portion of the central spindle portion and the sprocket carrier. The radially inner bearing may be fixed axially relative to the first end portion of the central spindle portion.

The second radially inner bearing may be arranged between the pawl holding member and the second end portion. The outer race of the second radially inner bearing may be fixed relative to the pawl holding member. The inner race of the second radially outer bearing may be slidably mounted on the second end portion of the central spindle portion.

Embodiments of the invention will now be described by way of example only, with reference to the accompanying drawings, in which.

Figure 1:
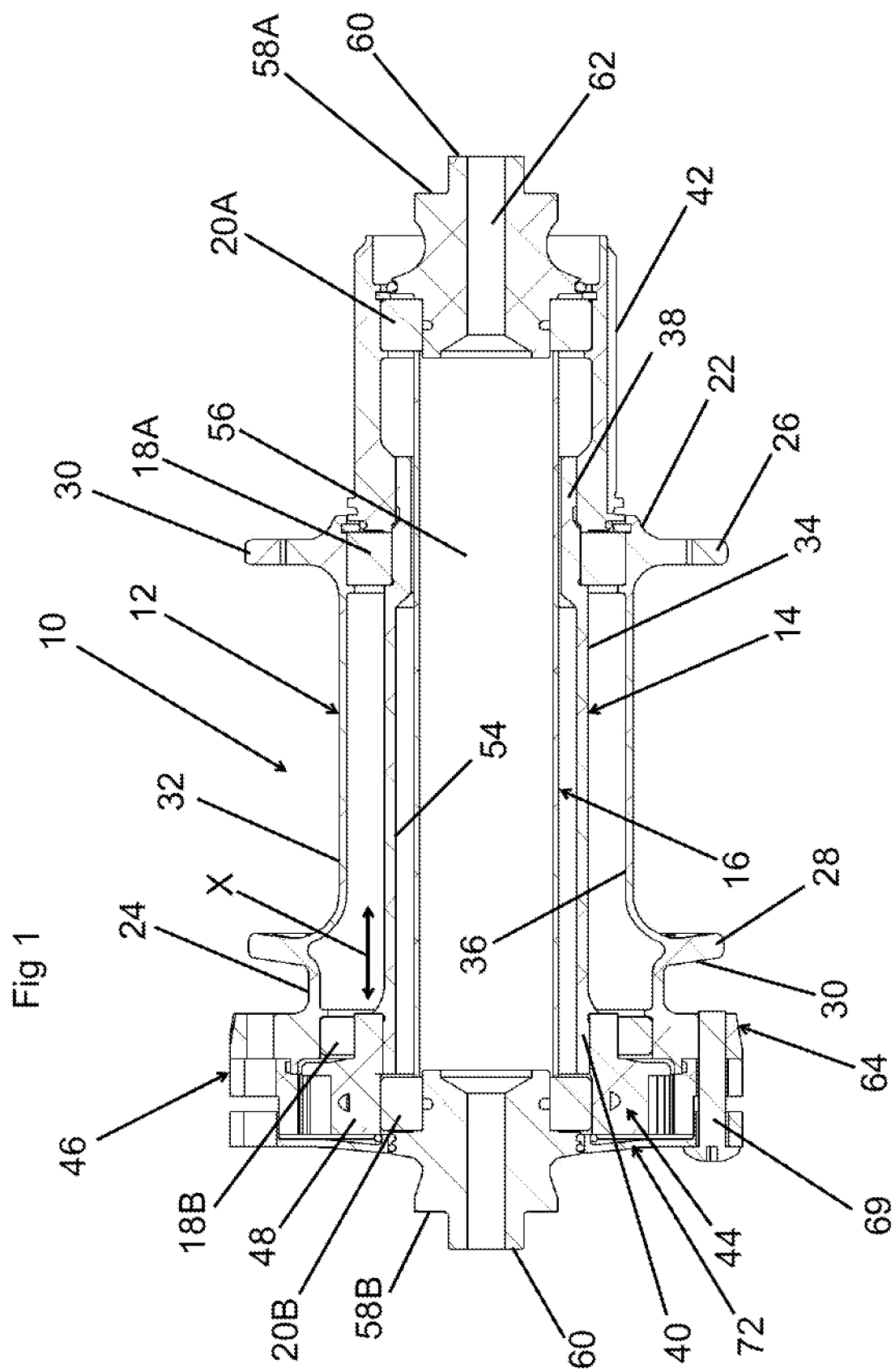
FIG. 1 is a sectional side view of a wheel hub.
Figure 2:
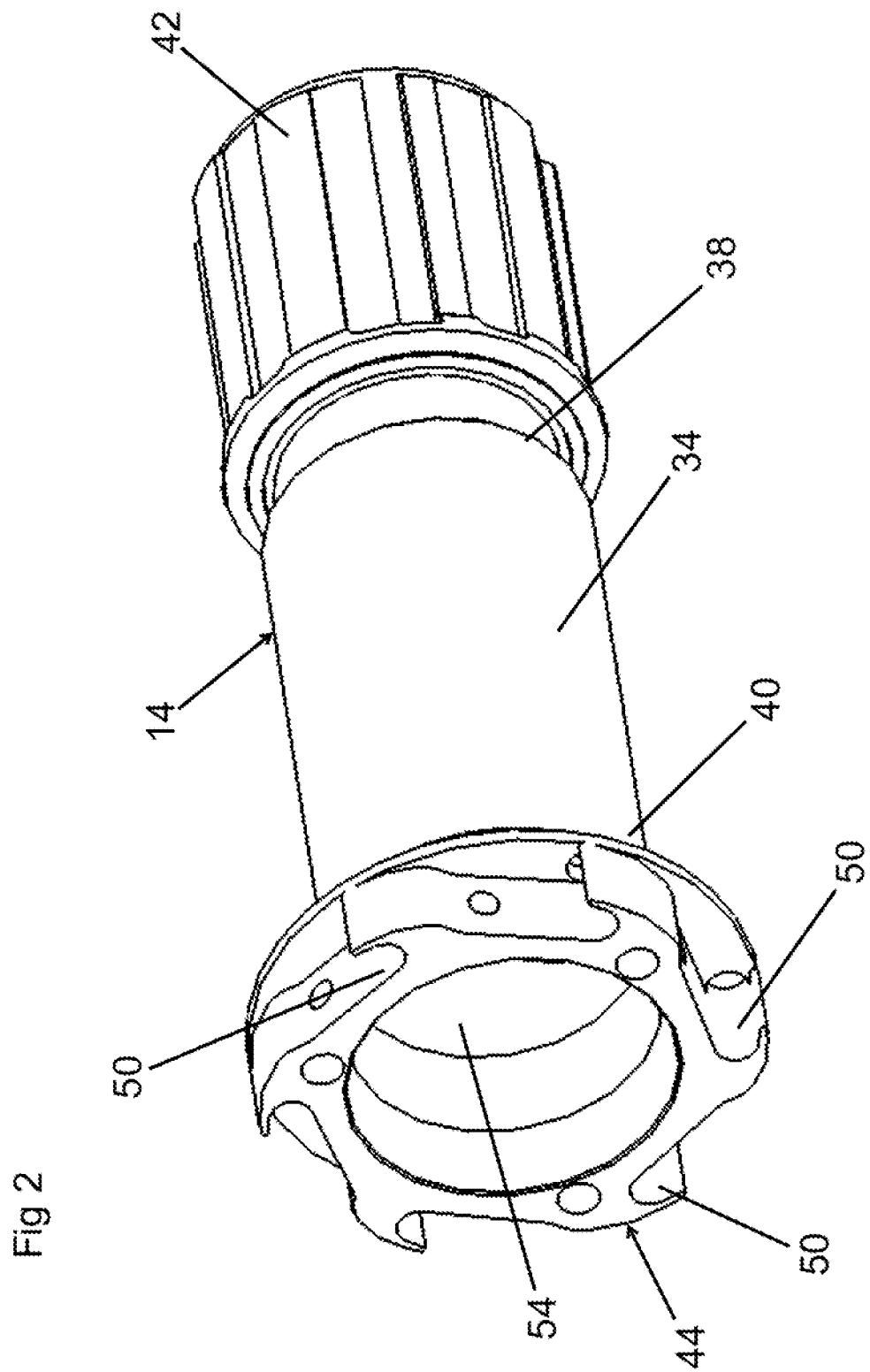
FIG. 2 is a perspective side view of a drive axle arrangement.
Figure 3:
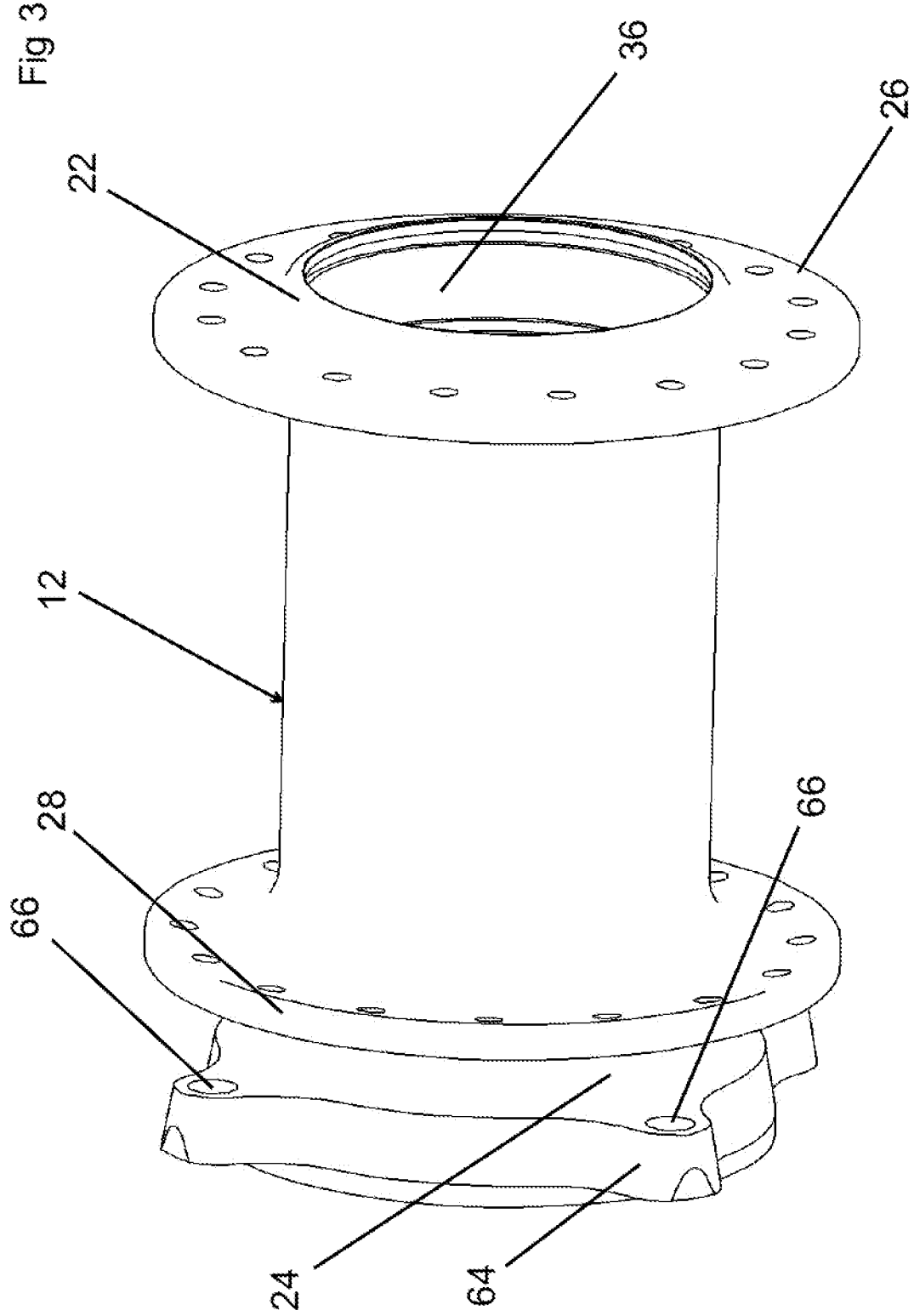
FIG. 3 is a perspective side view of a main body.

The drawings show embodiments of a wheel hub 10, for example for a bicycle. The wheel hub 10 comprises a main body 12, a drive axle arrangement 14 extending through the main body 12, and a support arrangement in the form of a spindle arrangement 16 extending through the drive axle arrangement 14.

First and second radially outer bearings 18A, 18B are provided between the main body 12 and the drive axle arrangement 14, thereby allowing the main body 12 to rotate about the drive axle arrangement 14. First and second radially inner bearings 20A, 20B are provided between the drive axle arrangement 14 and the spindle arrangement 16, thereby allowing the drive axle arrangement 14 to rotate around the spindle arrangement 16.

The main body 12 has a first end region 22 and an opposite second end region 24. A first spoke holding raised portion in the form of a first flange 26 extends radially outwardly from the first end region 22. A second spoke holding raised portion in the form of a second flange 28 extending radially outwardly from the second end region 24. Each of the first and second flanges 26, 28 has an externally facing surface 30. A tubular central region 32 of the main body 12 extends across a central point of the main body 12 between the first and second spoke holding flanges 26, 28.

The drive axle arrangement 14 comprises an axle portion 34. The main body 12 defines an axle receiving bore 36 through which the axle portion 34 extends. The axle portion 34 has a first end 38 and an opposite second end 40.

The drive axle arrangement 14 further includes a sprocket carrier 42 fixedly attached to the first end region 38 of the axle portion 34. The sprocket carrier 42 is in the form of a freehub body on which a plurality of sprockets are mounted. The sprockets may be provided in the form of a cassette.

The sprocket carrier 42 may be integrally formed with the axle portion 34. Alternatively, the sprocket carrier 42 may be separate from the axle portion 34, and may be fixedly attached thereto, for example, by corresponding threads on the sprocket carrier 42 and on the axle portion 34.

A first transmission arrangement 44 is provided on the opposite second end 40 of the axle portion 34, and is part of a freewheel mechanism that operates between the drive axle arrangement 14 and the main body 12. The first transmission arrangement 44 is fixedly attached to the axle portion 34.

The first transmission arrangement 44 may be integrally formed with the axle portion 34. Alternatively, the first transmission arrangement 44 may be separate from the axle portion 34, and may be fixedly attached thereto, for example, by corresponding threads on the first transmission arrangement 44 and on the axle portion 34.

A second transmission arrangement 46 is provided, which can be attached to the main body 12 in use. The second transmission arrangement 46 is described below.

In the embodiments described herein, the first and second transmission arrangements 44, 46 are disposed externally of the tubular central region 32 of the main body 12. In addition, as can be seen from the drawings, in the embodiments shown, the first and second transmission arrangements 44, 46 are provided externally of the main body 12 itself.

The combination of the first and second transmission arrangements 44, 46 constitutes a transmission assembly to transmit a driving force (i.e. a force of rotation of the drive axle arrangement 14) to the main body 12, so that rotation of the drive axle arrangement 14 in a forward first direction, for example by pedalling the bicycle, is transmitted to the main body 12. Rotation of the drive axle arrangement 14 in an opposite second direction allows the drive axle arrangement 14 and the main body 12 to rotate relative to each other.

The first transmission arrangement 44 comprises a pawl holding member 48 which extends radially outwardly from the axle portion 34. The pawl holding member 48 defines a plurality of recesses 50 in which a plurality of pawls 52 are held. The recesses 50 are arranged circumferentially around the pawl holding member 48. The pawls 52 are urged outwardly by respective springs 53. The operation of the transmission assembly is discussed below.

The drive axle arrangement 14 defines a through bore 54, which the spindle arrangement 16 extends through. The spindle arrangement 16 comprises a cylindrical central spindle portion 56 extending through the through bore 54. The spindle arrangement 16 further includes opposite first and second end members 58A, 58B at the ends of the central spindle portion 56. The end members 58A, 58B engage the rear dropouts on the frame of the bicycle.

Each of the first and second end members 58A, 58B comprises a protruding member 60 which can be received by, or engage, the rear dropouts of the bicycle frame. Each end member 58A, 58B defines a respective receiving bore 62 through which a suitable wheel mounting component for mounting the wheel hub on the bicycle frame extends, for example a wheel skewer (not shown) or through axle bolt. In the case of a skewer, the skewer has a respective gripping member at each end. The rear dropouts of the frame are gripped between the gripping members and the end members 58A, 58B, thereby securing the wheel hub 10 to the frame, as would be understood by the person skilled in the art.

The main body 12 further includes a securing formation 64 for securing a brake disc 70 to the main body 12. In use, the brake disc 70 is gripped by the pads of a caliper (not shown) on the bicycle frame.

The securing formation 64 comprises a disc attaching member 64 extending radially outwardly from the second end region 24 of the main body 12. The disc attaching member 64 is disposed outwardly of the second spoke receiving flange. The disc attaching member 64 defines a plurality of threaded fastening apertures 66 for receiving a plurality of fasteners in the form of bolts 69 (see FIG. 1). The use of the disc attaching member 64 is described below.

As would be understood by those skilled in the art, the first and second radially outer bearings 18A, 18B and the first and second radially inner bearings 20A, 20B comprise inner and outer races.

The first radially outer bearing 18A is arranged between the first end region 22 of the main body 12 and the drive axle arrangement 14. The first radially outer bearing 18A is fixed axially relative to the main body 12 and the drive axle arrangement 14. The first outer bearing cannot move axially relative to the main body 12 or the drive axle arrangement 14.

The first radially inner bearing 20A is arranged between the first end member 58A and the sprocket carrier 42. The first radially inner bearing 20A is fully constrained in its position and cannot move axially relative to the first end member 58A or the sprocket carrier 42

The second radially outer bearing 18B is arranged between the second end 24 of the main body 12 and the pawl holding member 48. The outer race of the second radially outer bearing 18B is fixed relative to the main body 12 and cannot move relative thereto.

The inner race of the second radially outer bearing 18B is slidably mounted on the pawl holding member 48, thereby allowing the pawl holding member 48 and the drive axle arrangement 14 to move axially relative to the second radially outer bearing 18B, as shown by the double headed arrow X in FIG. 1.

The second radially inner bearing 20B is arranged between the pawl holding member 48 and the second end member 58B. The inner race of the second radially inner bearing 20B is fixed relative to the second end member 58B and cannot move relative to thereto. The outer race of the second radially inner bearing 20B is slidably mounted on the pawl holding member 48, thereby allowing the spindle arrangement 16 to move axially relative to the second radially inner bearing 20B.

The slidable mounting of the second radially outer and radially inner bearings 18B, 20B on the pawl holding member 48 enables radially outer and radially inner bearings 18B, 20B to move relative to other components of the wheel hub 10, thereby allowing the wheel hub 10 to be tightened into a bicycle frame without compressive loading being applied to the bearings 18A, 18B, 20A, 20B.

Figure 4:
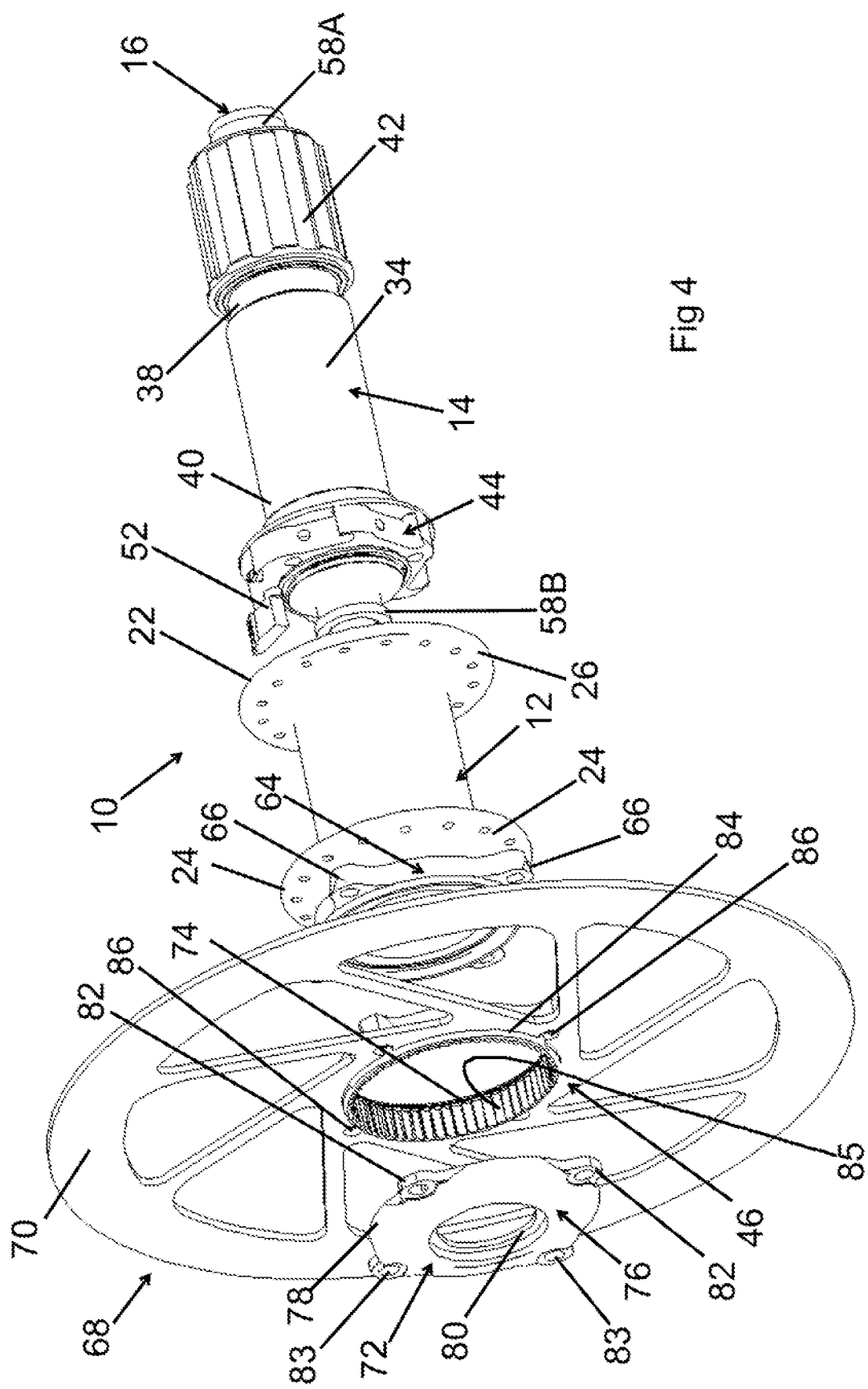
FIG. 4 is an exploded perspective view of the wheel hub with a first brake disc assembly.

Referring to FIG. 4, a first disc brake assembly 68 is secured to the wheel hub 10. The first disc brake assembly 68 comprises the brake disc 70 and a securing arrangement 72 to secure the brake disc 70 to the disc attaching member 64.

The brake disc 70 defines a central mounting aperture 74, which is of a size to receive the first transmission arrangement 44 of the drive axle arrangement 14, and thereby allows the brake disc 70 to be mounted on the wheel hub 10. When the brake disc 70 is mounted on the wheel hub 10, the edge of the mounting aperture 74 extends around the transmission assembly.

The securing arrangement 72 comprises a cover member 76 (see FIG. 4) and the plurality of fasteners.

The cover member 76 is arranged on the brake disc 70 to enhance the securing of the brake disc 70 on the main body 12, and to improve the aesthetics of the securing arrangement 72. In some embodiments, a spacer member may be provided. The spacer member can be arranged between the brake disc 70 and the disc attaching member 64.

The cover member 76 comprises a cover portion 78 defining a central aperture 80 to allow the cover member 76 to be received on the main body 12. The cover member 76 comprises a plurality of eyes 82, each defining a respective fastening aperture 83 through which the fasteners can extend. A respective fastener can extend through the fastening aperture 83 in each eye 82 to secure the cover member 76 and the brake disc 70 to the disc attaching member 64, as explained below.

The second transmission arrangement 46 is provided on a transmission member in the form of a brake component. The brake component is a component of the first disc brake assembly 68. Referring to FIG. 4, the second transmission arrangement 46 is provided on a brake component in the form of the brake disc 70. The second transmission arrangement 46 is provided in the mounting aperture 74. As shown, the second transmission arrangement 46 is attached to an inner edge 84 of the brake disc 70 defining the mounting aperture 74. The second transmission arrangement 46 extends axially from the brake disc 70 in opposite directions.

The second transmission arrangement 46 comprises an annular ratchet portion having radially inwardly directed teeth 85.

The brake disc 70 also comprises a securing portion in the form of a plurality of fastening apertures 86 defined by the brake disc 70. The fasteners can extend through the fastening apertures 86.

The brake disc 70 is arranged in engagement with the disc attaching member 64 so that the fastening apertures 86 in the brake disc 70 are aligned with the fastening apertures 83 in the eyes 82 of the disc attaching member 64.

In order to secure the brake disc 70 to the wheel hub 10, the fastening apertures 83 in the cover member 76 are aligned with the fastening apertures 86 in the brake disc 70. The fastenings can then be received through the fastening apertures 86 in the cover member and the brake disc 70 and screwed into the threaded fastening apertures 83 in the eyes 82 of the disc attaching member 64. The brake disc 70 is thus secured by the cover member 76 to the disc attaching member 64.

When the brake disc 70 is secured to the wheel hub 10 as described above, the second transmission arrangement 46 extends around the first transmission arrangement 44 in concentric alignment therewith. The radially inwardly extending teeth 85 of the second transmission arrangement 46 are arranged in concentric alignment with the first transmission arrangement 44 on the axle portion 34 of the drive axle arrangement 14.

As will be understood by the skilled person, the pawls 52 of the first transmission arrangement 44 cooperate with the teeth 85 of the second transmission arrangement 46 to rotate the main body 12.

Figure 7:
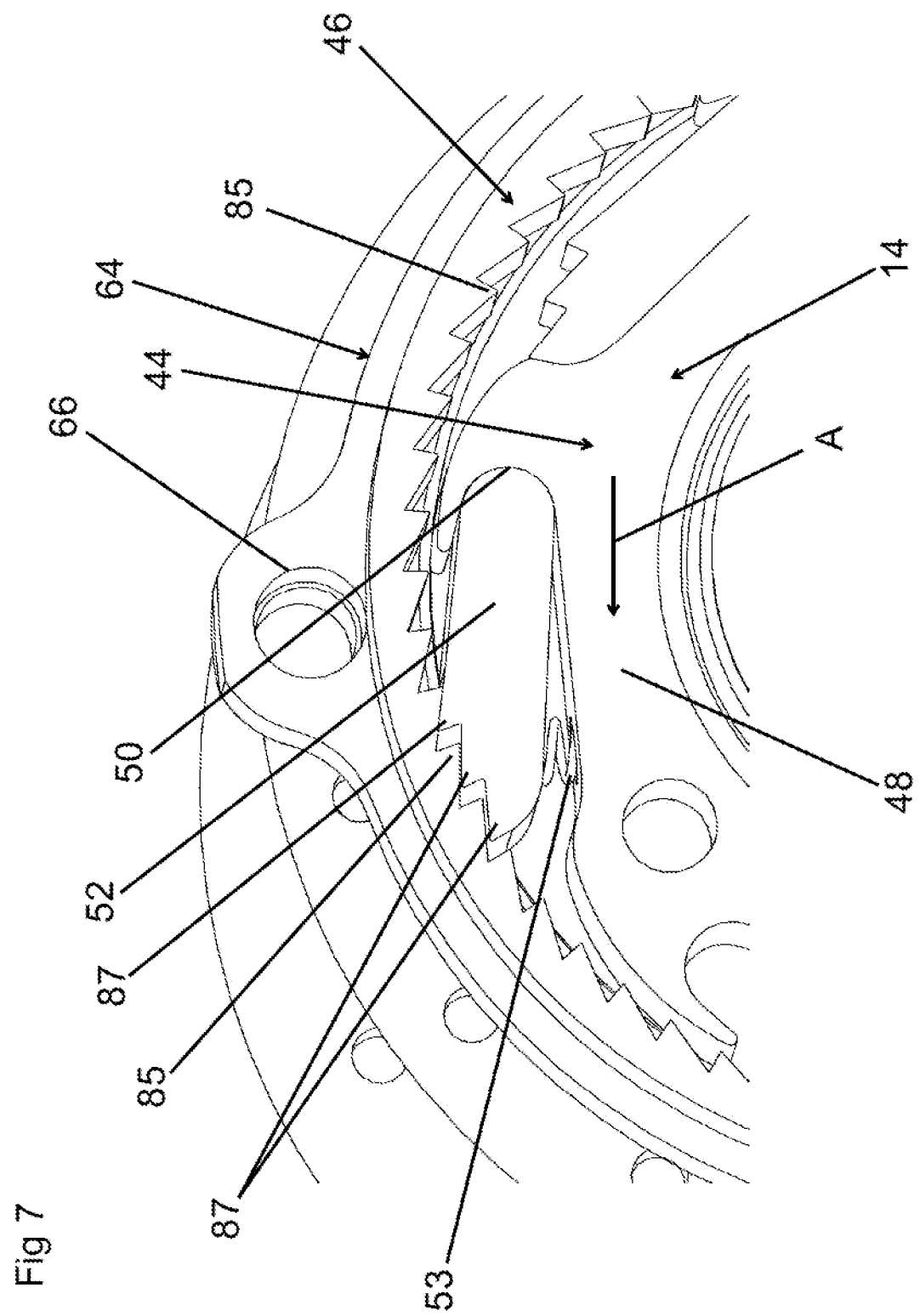
FIG. 7 is an internal close up view of first and second transmission arrangements.

FIG. 7 shows a close up of the first and second transmission arrangements 44, 46. A proximal end of the pawl 52 is pivotally secured in one of the recesses 50 defined by the pawl holding member 48.

The opposite distal end of each pawl 52 includes a plurality of corresponding teeth 87, for example three teeth 87. The spring 53 urges the distal end of the pawl 52 outwardly so that the plurality of corresponding teeth 87 are urged into meshing engagement with the teeth 85 of the second transmission arrangement 46.

When the drive axle arrangement 14 is rotated relative to the main body 12 in a forward direction indicated by the arrow A, the pawls 52 drivingly engage the teeth 85 and drive the main body 12 in the same direction.

When the drive axle arrangement 14 is rotated relative to the main body 12 in the opposite direction to the arrow A, the distal end region of each pawl 52 is urged inwardly so that the pawls 52 are disengaged from the teeth 85 to allow the drive axle arrangement 14 to rotate without causing any rotation of the main body 12.

Figure 5:
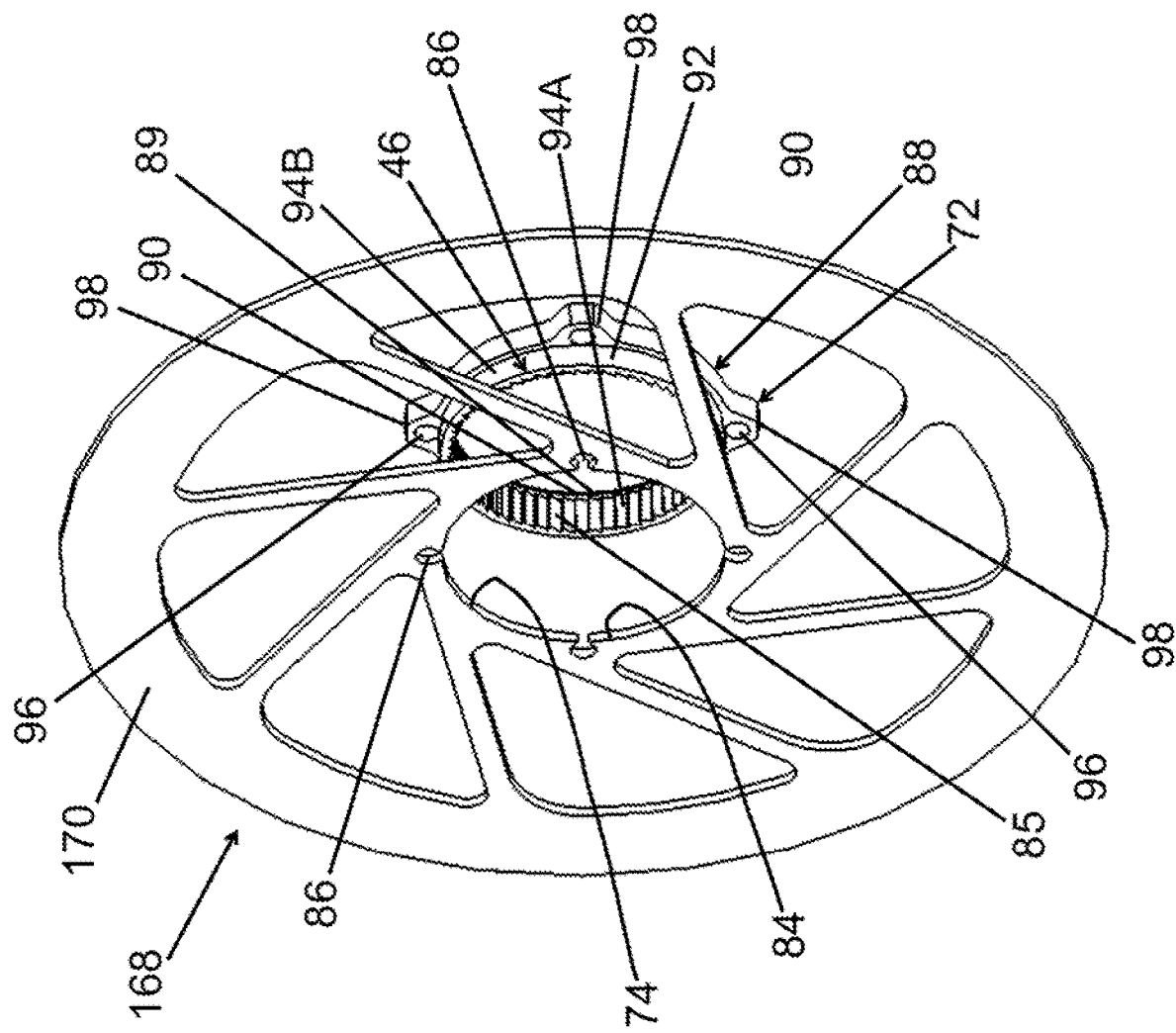
FIG. 5 shows parts of a second brake disc assembly.

FIG. 5 shows a second disc brake assembly 168, which comprises many of the features of the first disc brake assembly 68 shown in FIG. 4, and these features have been designated in FIG. 5 with the same reference numerals as the corresponding features shown in FIG. 4.

The embodiment shown in FIG. 5 differs from the embodiment shown in FIG. 4 in that the embodiment shown in FIG. 5 comprises a brake disc 170, in which the second transmission arrangement 46 is provided on a brake component in the form of a spacer member 88, instead of on the brake disc 170.

In the embodiment shown in FIG. 5, the spacer member 88 has an inner edge 89 defining a central aperture 90. The second transmission arrangement 46 is in the form of an annular projecting portion 92 which extends axially from the spacer member 88 at the central aperture 90.

The projecting portion 92 has radially inner faces 94A and radially outer faces, 94B. The teeth 85 are provided on the radially inner face 94A of the projecting portion 92, and extend across the central aperture 90 of the spacer member 88. In the embodiment shown, the teeth 85 extend part way across the inner edge 89 of the central aperture 90 to provide room for a groove (not shown) defined by the inner edge 89. An 0 ring seal may be received in the groove.

The spacer member 88 has a plurality of fastening apertures 96 defined in eyes 98 and is arranged between the brake disc 170 and the disc attaching member 64. The annular projecting portion 92 extends through the mounting aperture 74 in the brake disc 170.

The cover member 76 (not shown in FIG. 5) is arranged on the brake disc 170 and the fasteners inserted through the fastening apertures 83 in the cover member 76, the fastening apertures 86 in the brake disc 170 and the fastening apertures in 96 in the spacer member 88. The fasteners are screwed into the fastening apertures 66 in the disc attaching member 64 to secure the brake disc 170 thereto.

When the brake disc 170 is secured to the wheel hub 10, the annular projecting portion 92 of the spacer member 88 projects through the mounting aperture 74 in the brake disc 170. In this position, the teeth 85 are arranged radially outwardly of the first transmission arrangement 44 in concentric alignment therewith.

As a result, the pawls 52 on the first transmission arrangement 44 drivingly engage the teeth 85 of the second transmission arrangement 46 when the drive axle arrangement 14 is rotated in the forward direction, thereby driving the main body 12.

When the drive axle arrangement 14 is rotated in the opposite direction, the pawls 52 are disengaged from the teeth 85 of the second transmission arrangement 46, thereby allowing the drive axle arrangement 14 to rotate relative to the main body 12.

Figure 6:
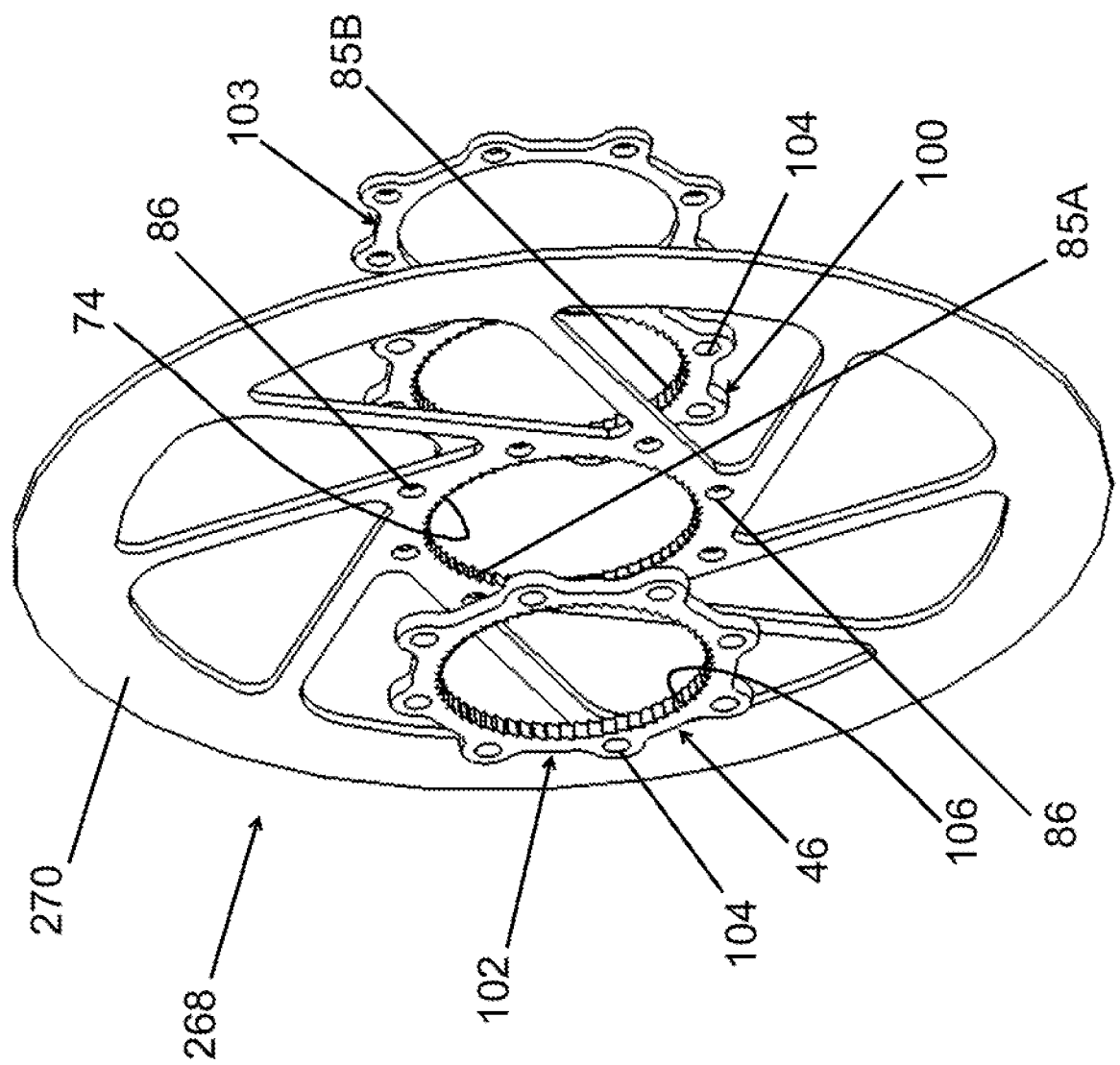
FIG. 6 shows parts of a third brake disc assembly.

A third disc brake assembly 268 is shown in FIG. 6. The third disc brake assembly 268 comprises a brake disc 270, which has many of the features of the first disc brake assembly 68 shown in FIG. 4, and these features have been designated in FIG. 6 with the same reference numerals as the corresponding features shown in FIG. 4.

A part of the second transmission arrangement 46 is provided on the inner edge 84 of the brake disc 270 defining the mounting aperture 74. The aforesaid part of the second transmission arrangement 46 comprises an array of radially inwardly directed teeth 85A extending around the inner edge 84.

The third disc brake assembly 268 shown in FIG. 6 further includes inner and outer spacers 100, 102. The inner spacer 100 is provided between the brake disc 70 and the disc attaching member 64. The outer spacer 102 is provided between the brake disc 70 and the cover member 76 (not shown in FIG. 6). FIG. 6 also shows an optional further spacer 103.

Each of the inner and outer spacers 100, 102 includes a securing portion comprising fastening apertures 104 which are aligned with the fastening apertures 86 in the brake disc 270 and in the cover member 76. The fasteners extend through the fastening apertures 83, 86, 104 into the cover member 76, the brake disc 270 and the inner and outer spacers 100, 102 to secure them to the disc attaching member 64.

The inner and outer spacers 100, 102 also have central mounting apertures 106 defined by respective inner edges of the spacers 100, 102. The central mounting apertures 106 are aligned with the mounting apertures 74, in the brake disc 270 and the central aperture 80 in the cover member 76 when they are mounted on the disc attaching member 64.

The inner edges defining the mounting apertures in the inner and outer spacers 100, 102 are provided with respective further parts of the second transmission arrangement 46. Each of the further parts of the second transmission arrangement 46 comprise an array of radially inwardly directed teeth, designated 85B, on the inner spacer 100, and 85C, on the outer spacer 102. The teeth 85B, 85C extend around the respective mounting apertures 106.

When the disc brake assembly 268 shown in FIG. 6 is attached to the wheel hub 10, the teeth 85A on the brake disc 270 and the teeth 85B, 85C on the inner and outer spacers 100, 102 are aligned with each other so that they can cooperate with the pawls 52 of the first transmission arrangement 44.

There is thus described embodiments of a wheel hub 10 that, by virtue of the sprocket carrier 42 being provided on a drive axle arrangement 14, several advantages of the embodiments described herein are provided. Examples of these advantages are as follows.

1) A large diameter axle portion 34 can be provided, thereby increasing strength. In addition, the feature that the drive axle arrangement 14 extends wholly through the main body 12 provides far greater strength, stiffness and more efficient use of materials.

2) Transfer of the driving force from the side of the sprocket carrier 42 to the opposite side of the wheel hub 10 also allows not only a large diameter spindle to be provided, but also the diameter of the spindle arrangement 16 to be increased over prior art designs.

3) The feature that the transmission assembly can be arranged on the opposite side of the wheel hub 10 to the sprocket carrier 42 means that the transmission assembly does not have to be radially aligned with one of the spoke holding flanges, and as a result, the diameter of the transmission assembly is not limited by the spoke flange diameter. This feature may allow less force on the pawls 52 and ratchet teeth 85 for the same drive torque.

4) This further provides that the first and second transmission arrangements 44, 46 can be of an increased diameter compared to prior art wheel hubs 10. This may allow larger or an increased number of teeth 85

5) By increasing the diameter of the first and second transmission arrangements 44, 46, the loads on the pawls 52 and the ratchet teeth 85 is reduced if the number of pawls 52 is kept the same as prior art wheel hubs. The increase in diameter of the first and second transmission arrangements 44, 46 means alternatively that the number of pawls 52 could be reduced with the same load in each pawl 52 as prior art wheel hubs.

6) The first and second transmission arrangements 44, 46 are easily replaceable.

7) Only the radially inner bearings 18A, 18B or the radially outer bearings 20A, 20B are required at any one time, thereby minimising bearing wear.

8) The wheel hubs 10 are of a modular construction, thereby allowing easy replacement of components.

9) The brake disc 70 and the second transmission arrangement 46 can be replaced as a unit. In the case of prior art designs, failure of the ratchet means that the hub usually has to be replaced.

10) Where the second transmission arrangement 46 and the brake disc 70 are provided as a single component, the brake disc 70 and the second transmission arrangement 46 are tightly attached to each other, thereby increasing strength of both of them.

11) By disposing the first and second transmission arrangements 44, 46 on the opposite side of the wheel hub 10 to the sprocket carrier 42, there is no need to remove the sprocket carrier 42 thereby making servicing much easier than prior art hubs.

Various modifications can be made without departing from the scope of the invention. For example, the ratchet and pawl construction of the first and second transmission arrangements 44, 46 could be another type of freewheel mechanism, such as a sprag clutch, disc face ratchet (sometimes called a star ratchet) or a cam plate mechanism.

The first and second end members 58A, 58B may be attached to the central spindle portion 56. Alternatively, the first and second end members 58A, 58B may be separate from the central spindle portion 56, and may be received in the central spindle portion 56.

In a further modification, the second force transmission arrangement 46 can be provided on the main body 12, instead of on the brake disc 270 or other components of the disc brake assembly 268.

In another modification, the main body 12 may be devoid of the spoke holding flanges. In this modification, the rim may be attached to the wheel hub 10 by a disc body or by moulded spokes. Alternatively, the main body 12 may have features to allow the use of straight pull spokes.

Figure 8:
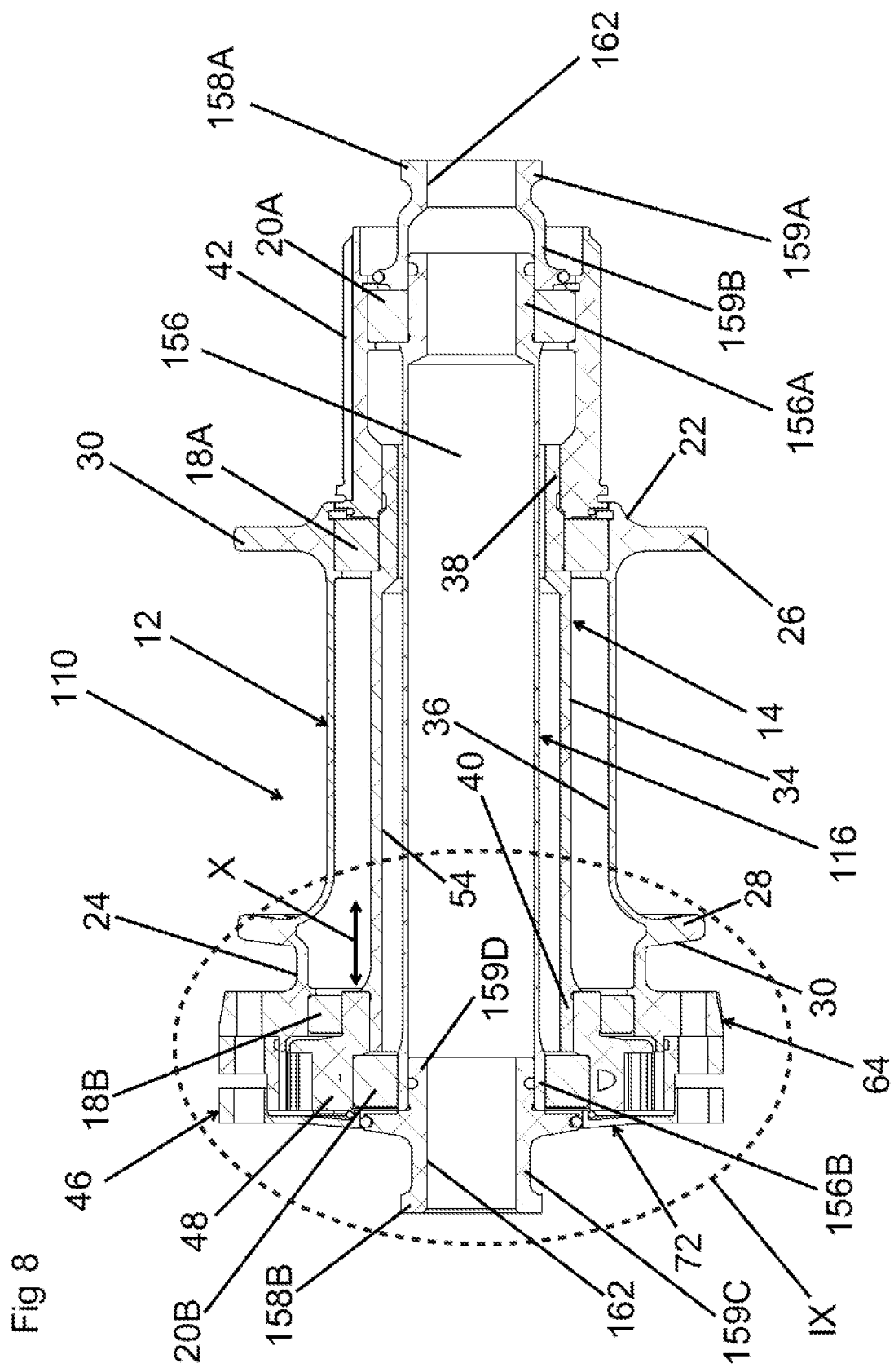
FIG. 8 is a sectional side view of another wheel hub.

A further wheel hub, generally designated 110, is shown in FIG. 8. The wheel hub 110 comprises many of the same features as the wheel hub 10. These features have been designated with the same reference numerals as the corresponding features of the wheel hub 10.

The wheel hub 110 comprises a support arrangement in the form of a spindle arrangement 116 which comprises a central spindle portion 156. The central spindle portion 156 further includes first and second end portions 156A and 1566.

The spindle arrangement 116 comprises first and second end members 158A, 158B to engage the rear dropouts of the frame of the bicycle. The first end member 158A comprises a first external region 159A for engaging one of the rear dropouts of the bicycle frame. The first end member 158A further includes a first internal region 159B on the first external region 159A. The first internal region 159B is arranged inside the sprocket carrier 42.

The first and second end members 158A, 158B may be attached to the central spindle portion 156. Alternatively, the first and second end members 158A, 158B may be separate from the central spindle portion 156, and may be received in the central spindle portion 156.

The first end portion 156A of the central spindle portion 156 is received in the first internal region 159B of the first end member 158A, thereby mounting the central spindle portion 156 on the first end member 158A.

The second end member 158B comprises a second external region 159C for engaging the other of the rear dropouts of the bicycle frame. The second end member 158B further includes a second internal region 159D arranged radially inside the main body 12. The internal region 159D is received in the second end portion 156B of the central spindle portion 156.

Each of the first and second end members 158A, 158B defines a respective receiving bore 162. The receiving bores 162 are wider than the receiving bores 62, and are intended to receive a wheel mounting component having a larger diameter, thereby increasing the stiffness of the wheel hub 10. Such wheel mounting components are known in the art as "through axle bolts".

It will be appreciated that the receiving bores 162 in the first and second end members 158A, 158B may be the same size as the receiving bores 62, thereby allowing the wheel hub 110 to be used with wheel mounting components in the form of skewers. Similarly, the receiving bores 62 could be the same size as the receiving bores 162, thereby allowing the wheel hub to 10 to be used with wheel mounting components in the form of through axle bolts.

The arrangement of the first radially outer bearing 18A and the second radially outer bearing 18B is the same as the first and second radially outer bearings 18A, 18B in the wheel hub 10. The first radially outer bearing 18A is fully constrained, whereas only the outer race of the second radially outer bearing 18B is fully constrained.

The inner race of the second radially outer bearing 18B is slidably mounted on the pawl holding member 48, as indicated by the double headed arrow X, thereby allowing the pawl holding member 48 and the drive axle arrangement 14 to move axially relative to the second radially outer bearing 18B.

The first radially inner bearing 20A is arranged between the first end portion 156A of the central spindle portion 156, and the sprocket carrier 42. The first radially inner bearing 20A is fully constrained in its position and cannot move axially relative to the first end portion 156A or the sprocket carrier 42

The second radially inner bearing 20B is arranged between the pawl holding member 48 and the second end portion 156B. The outer race of the second radially inner bearing 20B is fixed relative to the pawl holding member 48.

The inner race of the second radially inner bearing 20B is slidably mounted on the second end portion 156B of the central spindle portion 156, thereby allowing relative axial movement between the spindle arrangement 116 and the second radially inner bearing 20B.

The slidable mounting of the second radially outer and radially inner bearings 18B, 20B on the pawl holding member 48 and on the second end portion 156B of the central spindle portion 156 enables the second radially outer and radially inner bearings 18B, 20B to move relative to other components of the wheel hub 10 or 110. This allows components of the wheel hub 10 or 110 to be tightened onto each other during assembly or use without excessive axial loading being applied to the bearings 18A, 18B, 20A, 20B.

The slidable mounting of the second radially inner bearing 20B allows the wheel hub 10 or 110 to be tightened within the dropouts of the frame without excessive axial loading being applied to the radially inner bearings 20A and 20B.

Figure 9:
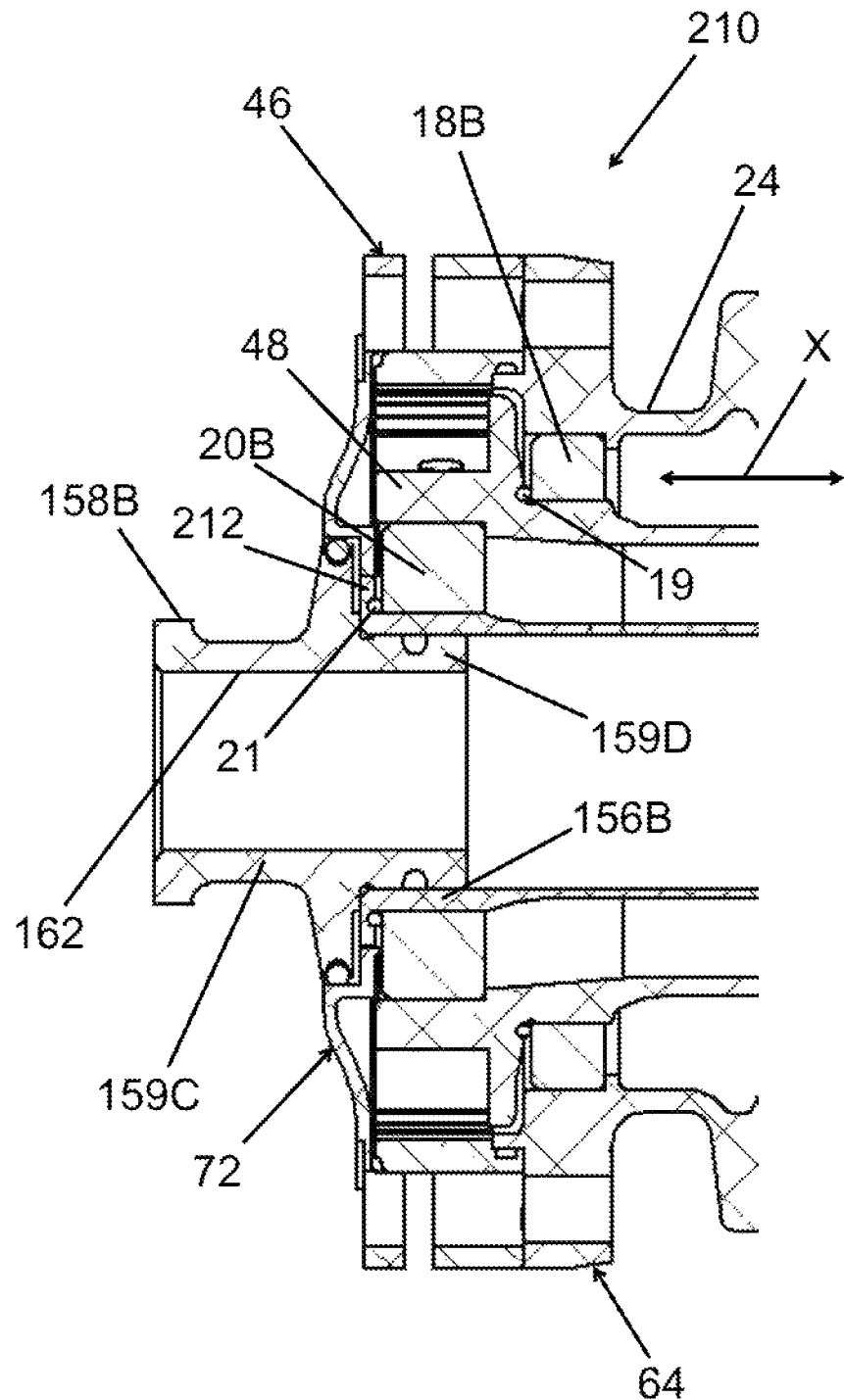
FIG. 9 is a close up view of an end region of a wheel hub, similar to the wheel hub shown in FIG. 8.

FIG. 9 shows a close up version of a wheel hub 210, which is a modified version of the wheel hub 110 shown in FIG. 8. The wheel hub 210 has many of the features of the wheel hub 110 shown in FIG. 8, and these features have been designated in FIG. 9 with the same reference numerals as the corresponding features shown in FIG. 8.

The central spindle portion 156 of the wheel hub 210 has a radially outwardly extending flange 212 on the second end portion 156B. An annular outer resilient member in the form of an outer axial preload washer 19 is provided between the pawl holding member 48 and the inner race of the second radially outer bearing 18B. An annular inner resilient member in the form of an inner axial preload washer 21 is provided between the flange 212 and the inner race of the second radially inner bearing 20B.

The outer and inner preload washers 19, 21 apply respective axial forces to the inner races of the radially outer and radially inner bearings 18A, 18B, 20A, 20B to urge the inner races of the radially outer and radially inner bearings 18A, 18B, 20A, 20B towards one another. This has the effect of removing any axial play in the radially outer and radially inner bearings 18A, 18B, 20A, 20B.

The wheel hub 10 shown in FIG. 1 may also possess inner and outer preload washers to remove axial play in the radially outer and radially inner bearings 18A, 18B, 20A, 20B.

Various further modifications can be made without departing from the scope of the invention: any suitable arrangement of the bearings 18A, 18B, 20A, 20B could be used that is different from the arrangement described above. For example, all the bearings could be fully constrained at their inner and outer races. Alternatively, different bearings could be made slidable, or different races could be fixed or made slidable.

The invention claimed is:

1. A wheel hub comprising:
a main body;
a drive axle arrangement extending through the main body, the main body being rotatable about the drive axle arrangement; and
a transmission assembly comprising first and second transmission arrangements, the first transmission arrangement being provided on the drive axle arrangement, and the second transmission arrangement being provided on the main body;
the first transmission arrangement being cooperable with the second transmission arrangement to transmit a driving force from the drive axle arrangement to the main body;
wherein the drive axle arrangement comprises an axle portion and a sprocket carrier configured to carry at least one sprocket;
wherein the sprocket carrier is attached to the axle portion at a first end of the axle portion, and the first transmission arrangement is provided on the axle portion at an opposite second end of the axle portion.

2. A wheel hub according to claim 1, further including a support arrangement for supporting the drive axle arrangement, wherein the drive axle arrangement is rotatable about the support arrangement.

3. A wheel hub according to claim 2, wherein the support arrangement comprises a central spindle portion extending through the drive axle arrangement.

4. A wheel hub according to claim 2, wherein the main body and the drive axle arrangement are rotatable about the support arrangement.

5. A wheel hub according to claim 1, wherein the first and second transmission arrangements are configured to transmit the driving force from the drive axle arrangement to the main body when the drive axle arrangement is rotated in a forward direction, and to allow the drive axle arrangement to rotate in an opposite rearward direction relative to the main body.

6. A wheel hub according to claim 1, wherein the first transmission arrangement is provided on the axle portion.

7. A wheel hub according to claim 1, wherein the sprocket carrier is provided on the axle portion at a first end region of the main body, and the transmission assembly is provided at an opposite second end region of the main body, and wherein the second transmission arrangement is provided on the main body at the second end region of the main body.

8. A wheel hub according to claim 1, wherein the second transmission arrangement is a part of the main body.

9. A wheel hub according to claim 1, wherein the main body comprises a securing formation to allow the second transmission arrangement to be secured to the main body in cooperative association with said first transmission arrangement.

10. A wheel hub according to claim 9, wherein the sprocket carrier is provided on the axle portion at a first end region of the main body, and the transmission assembly is provided at an opposite second end region of the main body, wherein the securing formation extends outwardly from the second end region of the main body.

11. A wheel hub according to claim 9, comprising a transmission member on which the second transmission arrangement is provided, the transmission member including a securing portion to allow the transmission member to be secured to the main body.

12. A wheel hub according to claim 11, wherein the transmission member comprises a brake component securable to the main body.

13. A wheel hub according to claim 11, wherein the transmission member comprises a spacer for positioning a brake disc in a desired position, the second transmission arrangement being arranged on the spacer to be aligned with the first transmission arrangement when the spacer is secured to the main body.

14. A wheel hub according to claim 11, wherein the transmission member comprises a brake disc, the second transmission arrangement being arranged on the brake disc to be aligned with the first transmission arrangement when the brake disc is secured to the main body.

15. A wheel hub according to claim 1, wherein the sprocket carrier is fixedly attached to the axle portion, whereby the sprocket carrier and the axle portion cannot rotate relative to one another.

16. A wheel hub according to claim 1, wherein:
the main body includes first and second raised portions at the respective opposite first and second end regions of the main body, each of the first and second raised portions having an externally facing surface;
a central region of the main body being defined from the externally facing surface of the first raised portion to the externally facing surface of the second raised portion;
the transmission assembly being provided externally of the central region.

17. A wheel hub according to claim 16, wherein the transmission assembly is provided externally of the main body.

18. A wheel hub comprising:
a main body;
a drive axle arrangement extending through the main body, the main body being rotatable about the drive axle arrangement; and
a transmission assembly comprising first and second transmission arrangements, the first transmission arrangement being provided on the drive axle arrangement, and the second transmission arrangement being provided on the main body;
the first transmission arrangement being cooperable with the second transmission arrangement to transmit a driving force from the drive axle arrangement to the main body;
wherein the wheel hub comprises a transmission member on which the second transmission arrangement is provided; and wherein the transmission member has an inner edge defining a central aperture to allow the transmission member to be received on the main body, the second transmission arrangement being provided on the aforesaid inner edge.

19. A wheel hub according to claim 18, wherein the second transmission arrangement comprise an annular projecting portion extending around the inner edge of the transmission member to cooperate with the first transmission arrangement on the drive axle arrangement, the projecting portion extending axially from the transmission member.

20. A wheel hub comprising:
a main body;
a drive axle arrangement extending through the main body, the main body being rotatable about the drive axle arrangement; and
a transmission assembly comprising first and second transmission arrangements, the first transmission arrangement being provided on the drive axle arrangement, and the second transmission arrangement being provided on the main body;
the first transmission arrangement being cooperable with the second transmission arrangement to transmit a driving force from the drive axle arrangement to the main body;
wherein the wheel hub comprises a transmission member on which the second transmission arrangement is provided, the transmission member being one or both selected from the group consisting of:
a spacer for positioning a brake disc in a desired position, the second transmission arrangement being arranged on the spacer to be aligned with the first transmission arrangement when the spacer is secured to the main body; and
a brake disc, the second transmission arrangement being arranged on the brake disc to be aligned with the first transmission arrangement when the brake disc is secured to the main body.

21. A wheel hub comprising:
a main body;
a drive axle arrangement extending through the main body, the main body being rotatable about the drive axle arrangement; and
a freewheel mechanism between the drive axle arrangement and the main body;
wherein the drive axle arrangement comprises an axle portion and a sprocket carrier configured to carry at least one sprocket;
wherein the sprocket carrier is attached to the axle portion at a first end of the axle portion, and the freewheel mechanism is arranged at an opposite second end of the axle portion.

* * * * *